United States Patent [19]
Alver et al.

[11] 3,749,518
[45] July 31, 1973

[54] COMPOSITE BLADE ROOT CONFIGURATION

[75] Inventors: Alf S. Alver, Wapping; Walter Pilpel, West Hartford, both of Conn.

[73] Assignee: United Aircraft Corporation, East Hartford, Conn.

[22] Filed: Mar. 15, 1972

[21] Appl. No.: 234,755

[52] U.S. Cl. .............. 416/230, 416/219, 416/241, 416/248
[51] Int. Cl. .......................................... F01d 5/14
[58] Field of Search ............... 416/219, 224, 230, 416/241, 248

[56] References Cited
UNITED STATES PATENTS

| | | |
|---|---|---|
| 3,132,841 | 5/1964 | Wilder ........................ 416/229 X |
| 3,600,103 | 8/1971 | Gray et al. .................. 416/224 UX |
| 3,602,608 | 8/1971 | Morley ........................ 416/224 |
| 3,664,764 | 5/1972 | Davies et al. ............... 416/230 |
| 3,679,324 | 7/1972 | Stargardter ................ 416/230 X |

*Primary Examiner*—Everette A. Powell, Jr.
*Attorney*—Charles A. Warren

[57] ABSTRACT

In a fiber reinforced composite blade, the fibers are extended from the airfoil into the right and left side of the root. It is carefully determined which fibers are extended into the left side and which are extended into the right side to assure that all the fibers are wholly contained within the root and the minimum acceptable bend radius of the fibers is not violated.

4 Claims, 6 Drawing Figures

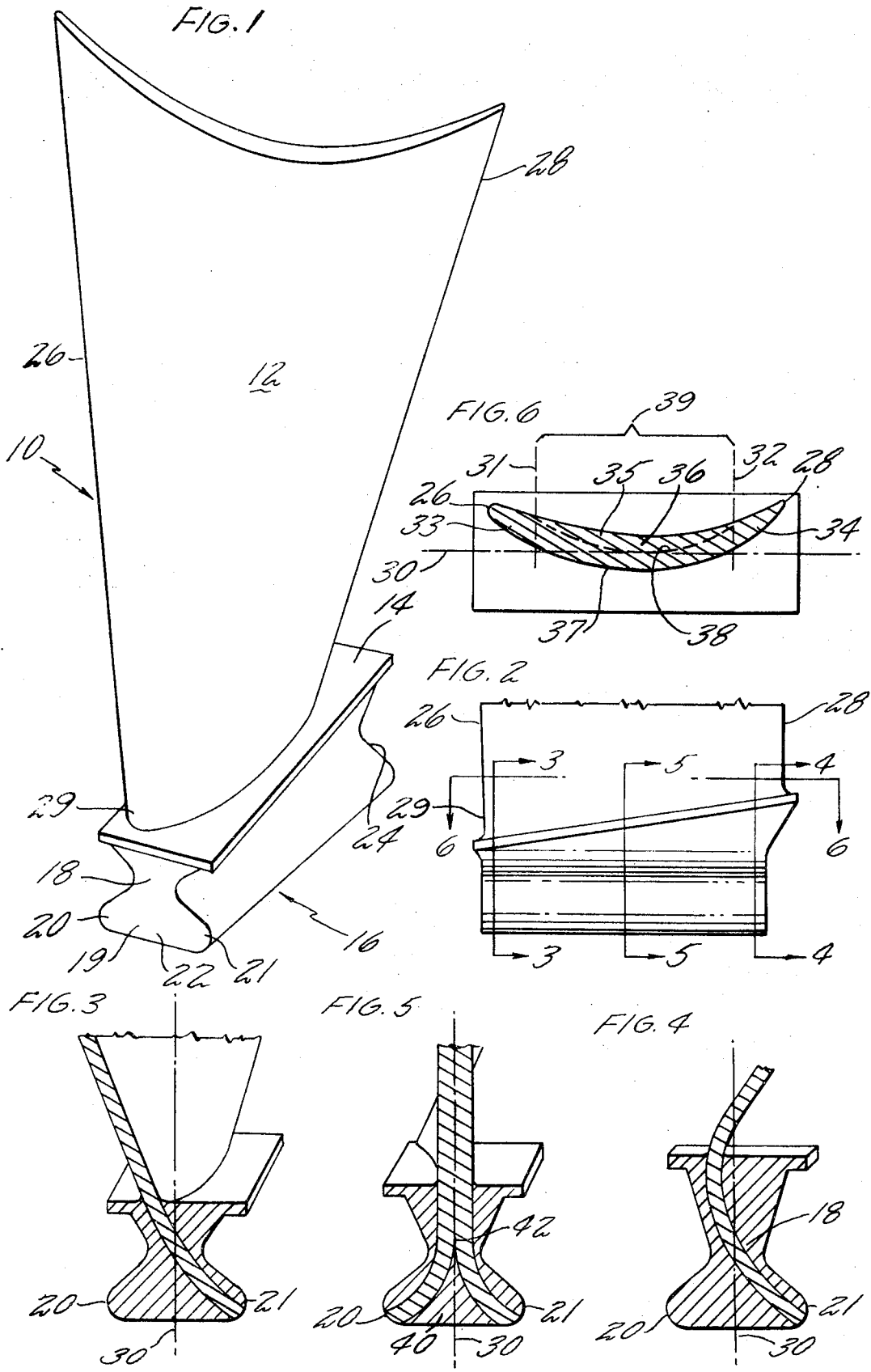

COMPOSITE BLADE ROOT CONFIGURATION

BACKGROUND OF THE INVENTION

1. Field of the Invention

This invention relates to composite blades and more particularly to an improved construction for composite blades.

2. Description of the Prior Art

It is well known that the use of high strength filament reinforced composite materials have undergone considerable research and developement in recent years for use in aircraft engines. The main reason for this research and development is the extremely high strength to weight ratio of these materials. A major difficulty with these materials is that their strength is essentially unidirectional, since the fibers are only extremely strong in tension. This unidirectional strength is, however, particularly suited to rotor blades, such as for fans, compressors, or turbines, wherein most of the forces are created by centrifugal loads and are radial. The high strength fibers in a composite blade are thus oriented in a substantially radial direction, running from the tip to the base of the blade, and thereupon into the root. The root may be any one of a number of configurations, such as dovetail, which is one of the most common. The blade is secured to the disc by inserting the root into a suitably shaped slot which may be an axial slot running from the front face to the rear face of the disc in the conventional manner, or which may be a circumferential slot such as would be used in a drum rotor configuration. The blade might also be attached to the disc by looping the composite fibers around pins which are fixedly attached to the disc. Notwithstanding which of the above techniques is used for securing the blade to the disc (or drum) there is the difficult problem of transferring the radial loads from the blade into the disc and strengthening the blade root to withstand the loads.

In most blade configurations the root portion is wider than the airfoil section so that it may be securely grasped by a disc or rotor and accommodate the high shear stresses. The composite fibers are brought from the tip into the root of the airfoil and are splayed (spread out) within the root portion to securely hold the fibers and to provide additional shear strength in the root. For example, in a filament reinforced composite blade having the well-known dovetail root, the fibers may be brought down through the airfoil into the root and splayed into two bundles along the mean camber line of the airfoil at the base of the airfoil, one bundle being curved into one of the dovetail tangs and the other bundle being curved into the other dovetail tang. This provides a more or less even distribution of fibers between the two tangs and the fibers run the full length of the root. A suitably shaped wedge might then be inserted between the fiber bundles and would also run the full length of the root.

It might appear that the above technique or any arbitrary, more or less equal split of fibers to each side of the root is suitable for any type or shape of composite fiber reinforced blade; however, this is not the case. The high tensile strength fibers used in composite blades are generally very brittle, and are often limited to a certain minimum bend radius to prevent overstressing of the fiber; the minimum bend radius increases rapidly as the diameter of the fiber increases. For highly cambered or highly twisted airfoils it may well be impossible to snake many of the fibers into the root and to curve them into a particular side of the root without either bending the fibers beyond their acceptable limit or having a portion of some fibers fall outside the root profile. This is particularly true of fibers coming from the leading and trailing edges of the airfoil, which are often the furthest removed from the center of the root; those fibers would first have to be bent in one direction toward the center of the root, so that they may be brought down into the root, and then they would have to be bent in the other direction away from the center of the root to bring them into the tangs. In a highly twisted airfoil the fibers in the leading and trailing edges are generally not radially oriented as they enter the root and require additional bending to direct them into the tangs.

The portion of any fiber which falls outside the root is, of course, cut when the root is machined or formed. In a blade having a dovetail root, the portion of the fiber most likely to be cut is between the underside of the blade platform and the bearing surface of the dovetail tang. The effect of cutting a fiber is twofold; first, the fiber no longer provides radial support for the blade; and second, the ends of the pieces of fibers in the tang will be exposed on the bearing surface of the tang and, if the fibers are of a hard material such as boron, alumina or sapphire they might cause unacceptable galling of the disc bearing surface.

SUMMARY OF THE INVENTION

An object of the present invention is an improved fiber reinforced composite blade construction that is particularly suited to blades having airfoils that are highly twisted or highly cambered.

According to the present invention, a fiber reinforced composite blade, including an airfoil and a root portion, comprises suitably defined regions of fibers in the airfoil, the fibers within each region extending from the airfoil into a suitable area of the root to assure that all fibers are continuous within the root and have bend radii greater than the minimum acceptable bend radius of the fibers.

For example, fibers which are located so that they cannot be extended into the right side of a root without violating the fiber minimum bend radius are included in a region of fibers which is extended only into the left side of the root and vice versa. Generally, fibers of that type will be clustered within a certain area of the airfoil, such as near the leading or trailing edge of a highly cambered airfoil. Other regions contain only fibers which can go into either side without any problems; within these regions the fibers may be divided into both the left and right sides of the root in any advantageous manner.

The above construction results in a root which will lack reinforcing fibers in localized areas thereof. It has been determined, however, that the overall strength of a root in a blade made in the manner of the present invention will generally be significantly stronger, despite the lack of reinforcing fibers in some localized areas, than would be the strength of the root if a significant number of fibers were either cut (such as described in the description of the prior art), cracked, or overstressed due to imparting to the fibers a smaller radius of curvature than they could tolerate.

The foregoing and other objects, features and advantages of the present invention will become more appar-

BRIEF DESCRIPTION OF THE DRAWING

FIG. 1 is a perspective view of a highly cambered and highly twisted compressor blade.

FIG. 2 is a partial side elevation view of the compressor blade shown in FIG. 1.

FIG. 3 is a sectional view of the root of the blade taken along the line 3—3 in FIG. 2.

FIG. 4 is a sectional view of the root of the blade taken along the line 4—4 in FIG. 2.

FIG. 5 is a sectional view of the root of the blade taken along the line 5—5 in FIG. 2.

FIG. 6 is a sectional view of the blade of FIG. 2 taken along the line 6—6 in FIG. 2.

DESCRIPTION OF THE PREFERRED EMBODIMENT

As an example of a blade embodying features of the present invention, consider a blade 10 as shown in FIG. 1, for use in a gas turbine engine. In this embodiment a compressor blade is shown. The blade comprises an airfoil portion 12, a platform 14, and a root 16. The root 16 is of the dovetail type and comprises a neck area 18 and a wider base portion 19, the base 19 comprising a left and right tang 20, 21, respectively. The root has forward and rearward ends 22, 24, respectively; and the airfoil 12 has a leading and trailing edge 26, 28, respectively a convex suction surface, a concave pressure surface, and a base 29.

A root center plane 30 (best shown in FIGS. 5 and 6) runs from the forward end 22 to the rearward end 24 of the root and divides the neck 18 and base 19 into left and right sides (FIG. 5). The fact that in this embodiment that portion of the root below the neck 18 is symmetrical about the plane 30 is in no way critical to the present invention although most roots would be designed in this manner. The airfoil 12 comprises a plurality of unidirectional high strength fibers, such as boron fibers, in a suitable matrix material such as aluminum; the axes of the boron fibers are oriented in a substantially spanwise direction. Fibers near the surface of the airfoil may be angled with respect to the spanwise fibers to provide some additional torsional rigidity to the airfoil. An example of an airfoil made in this manner is in a copending application to Walsh et al, U.S. Ser. No. 206,426, filed Dec. 9, 1971, and having the same assignee as the present invention.

As hereinbefore stated it is often necessary, to assure the structural integrity of a root, that certain areas therein be reinforced with some of the high strength fibers. In this embodiment these areas are the tangs 20, 21. A "limited fiber" is defined as one that cannot be extended into certain of these areas without passing outside the root or violating the minimum acceptable bend radius of the fiber. More particularly, a limited fiber is a fiber located on one side of the root center plane 30 as it enters the root, but which cannot be extended into the tang on the same side of the center plane without passing outside the root or violating the minimum acceptable bend radius of the fiber, as will hereinafter become clear. Boron fibers of the type used in this embodiment are approximately 0.005 inch in diameter; and their minimum acceptable bend radius is approximately ¾ of an inch. Knowing this minimum allowable bend radius it can be determined, for any particular airfoil and root configuration, which fibers are limited fibers.

As can best be seen in FIGS. 1 and 6 the airfoil 12 is highly cambered and highly twisted. It is readily noted from FIG. 6, which is a section taken near the base 29 of the airfoil 12, that fibers near the leading edge 26 and the trailing edge 28 are on the same side of the root center plane 30 and are laterally spaced therefrom by a substantial distance. Fibers near the leading and trailing edges are limited fibers due to their position with respect to the root center plane and their orientation due to the twist of the blade; these fibers cannot be extended into the left tang 20 without either passing outside the root at some point or violating the minimum acceptable bend radius of the fibers. It happens that in this embodiment only fibers near the leading and trailing edges are limited fibers.

Any airfoil cross-sectional area can be divided into regions which contain no limited fibers and regions which contain at least some limited fibers; these regions are herein defined as unlimited regions and limited regions, respectively. The purpose for dividing the cross-sectional area into regions in this manner will hereinafter become clear.

In the preferred embodiment the airfoil section (FIG. 6) is divided by dotted lines 31, 32 into three regions 33, 34, 35; the first and second regions are limited regions because they include limited fibers near the leading and trailing edges that cannot be curved through the neck 18 and into the left tang 20 without violating the minimum allowable bend radius of the fibers; all the fibers in these two regions are therefore extended into the right tang 21. With respect to those limited fibers within the first and second regions the right tang is herein defined as a safe area or safe tang. For a particular airfoil and root configuration there may be more than one safe area for a limited fiber. The fibers within the third region 35 are split into left and right bundles 36, 37, respectively, along a splay parting line 38; the left bundle 36 is extended into the left side of the root (the tang 20), and the right bundle 37 is extended into the right side of the root (the tang 21), to provide reinforcement to each side. A wedge 40 (FIG. 5) having a tip 42 is used in the central portion of the root between the bundles (36, 37) of fibers which are splayed to the left and right. This wedge 40 may be an insert which is bonded into place or it may be integral with the remaining portion of the root such as would be the case if the root were machined from a larger block of material within which the fibers of the airfoil are embedded. The splay parting line 38 (FIG. 6) is the locus of the tip 42 of the wedge.

As is apparent from the above description of the preferred embodiment only a central portion 39 of the root 16 will have fibers in both the left and right tangs 20, 21, respectively (see FIG. 5); and only the right tang 21 will contain fibers near the forward and rearward ends 22, 24 of the root (see FIGS. 3 and 4). However, recognizing that the largest portion of the blade radial loads are taken throughout the central portion of the blade root, it has been determined that generally the ends of the root are strong enough to take the shear loads imposed upon them without reinforcement. Also, as hereinabove stated, despite the lack of reinforcing fibers in some localized areas near the ends 22, 24 of the left tang 20 the overall structural integrity of the blade is significantly improved due to the lack of broken and overstressed fibers. Thus, by dividing the airfoil cross-sectional area into regions as hereinabove described, and by making sure that limited fibers are extended only into safe areas of the root, maximum usefulness is obtained from the total fiber volume.

Although this embodiment has a dovetail root this invention is not limited to use with any particular root configuration. Application of the principles hereinbefore described might prove useful for any root requiring fibers in each side thereof, such as the double dovetail root configuration described in our commonly owned copending application, Ser. No. 234,743, filed on even date herewith. It should be understood by those skilled in the art that the foregoing and other various changes and omissions in the form and detail of the invention may be made therein without departing from the spirit and scope of the invention.

Having thus described typical embodiments of our invention, that which we claim as new and desire to secure by Letters Patent of the United States is:

1. A composite blade comprising an airfoil and a dovetail shaped root, the root having a centerplane dividing the root into left and right sides, said root also having a neck, said left side including a left tang and said right side including a right tang, the airfoil including a base, a leading and trailing edge, an unlimited region, and fibers oriented in a substantially spanwise direction, and at the base thereof the airfoil having both its leading and trailing edges on the left side of the root centerplane, fibers near the leading and trailing edges being limited fibers and said right tang being a safe area for said limited fibers, said limited fibers extending into the root, through the neck, and thereupon into said right tang, and fibers between said leading and trailing edge limited fibers being within said unlimited region and extending into the root, through the neck, and thereupon being divided between said left and right tangs.

2. A composite blade comprising an airfoil and a root, said airfoil including a pressure surface, a suction surface, and fibers oriented in a substantially spanwise direction and extending into aid root, said root having a centerplane dividing said root into left and right sides, said root also having a neck, sai airfoil having a plurality of regions of fibers, said regions including at least one limited region and one unlimited region, each of said regions including both fibers adjacent said pressure surface and fibers adjacent said suction surface, one side and one side only of said root including a safe area for each of said limited regions of fibers, all fibers within each of said limited regions passing into said root through said neck and extending into said safe area for said limited region of fibers, and fibers within said unlimited regions extending into said root through said neck and being divided between said left and right sides of said root without passing outside said root and without violating the fiber minimum bend radius.

3. The composite blade according to claim 2 wherein said airfoil includes a base, and each limited region is positioned entirely on one side of said centerplane at said base, and said safe area for each limited region is on the other side of said centerplane from said limited region and each unlimited region straddles said centerplane at said base.

4. The composite blade according to claim 3 wherein said root is dovetail shaped and said right side includes a right tang, said left side includes a left tang, and said safe area is a tang, said root including a wedge separating the fibers of said unlimited region within said left side from the fibers of said unlimited region within said right side.

* * * * *